(12) United States Patent
Erkek et al.

(10) Patent No.: US 10,935,981 B2
(45) Date of Patent: Mar. 2, 2021

(54) FLOOR PROCESSING DEVICE WITH A BATTERY

(71) Applicant: Vorwerk & Co. Interholding GmbH, Wuppertal (DE)

(72) Inventors: David Erkek, Aarau (CH); Georg Hackert, Bochum (DE); Gerhard Isenberg, Cologne (DE); Roman Ortmann, Duisburg (DE); Andreas Schmidt, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 255 days.

(21) Appl. No.: 16/058,031

(22) Filed: Aug. 8, 2018

(65) Prior Publication Data
US 2019/0049976 A1 Feb. 14, 2019

(30) Foreign Application Priority Data

Aug. 10, 2017 (DE) ...................... 10 2017 118 227.6

(51) Int. Cl.
*G05D 1/02* (2020.01)
*A47L 9/28* (2006.01)
*A47L 11/40* (2006.01)
*A47L 5/22* (2006.01)

(52) U.S. Cl.
CPC ............. *G05D 1/0217* (2013.01); *A47L 5/22* (2013.01); *A47L 9/2805* (2013.01); *A47L 9/2842* (2013.01); *A47L 9/2847* (2013.01); *A47L 9/2884* (2013.01); *A47L 11/408* (2013.01); *G05D 1/0219* (2013.01); *A47L 2201/06* (2013.01); *G05D 2201/0203* (2013.01)

(58) Field of Classification Search
CPC .......... G05D 2201/0203; H02J 7/0048; F02N 2200/061
See application file for complete search history.

(56) References Cited

U.S. PATENT DOCUMENTS

2018/0184868 A1\* 7/2018 Han ...................... A47L 9/2873

FOREIGN PATENT DOCUMENTS

| JP | 2006-020830 A | \* | 1/2006 | ............... A47L 9/00 |
| JP | 2006-020830 A | | 1/2006 | |
| JP | 2006020830 | \* | 1/2006 | ............... A47L 9/00 |

\* cited by examiner

*Primary Examiner* — Thomas G Black
*Assistant Examiner* — Ana D Thomas
(74) *Attorney, Agent, or Firm* — Collard & Roe, P.C.

(57) ABSTRACT

A floor processing device has at least one electrical consumer, a battery for supplying power to the electrical consumer, and a control device for controlling the floor processing device. In order to avoid recharging the battery during an operating activity, the control device determines the anticipated energy required by one or more consumers to perform and fully complete a predefined operating activity, compares the anticipated energy required with an amount of energy stored in the battery, and if the stored amount of energy is less than the energy required, reduces the energy required by adjusting one or several operating parameters for the operating activity, in order to successfully execute the operating activity.

10 Claims, 1 Drawing Sheet

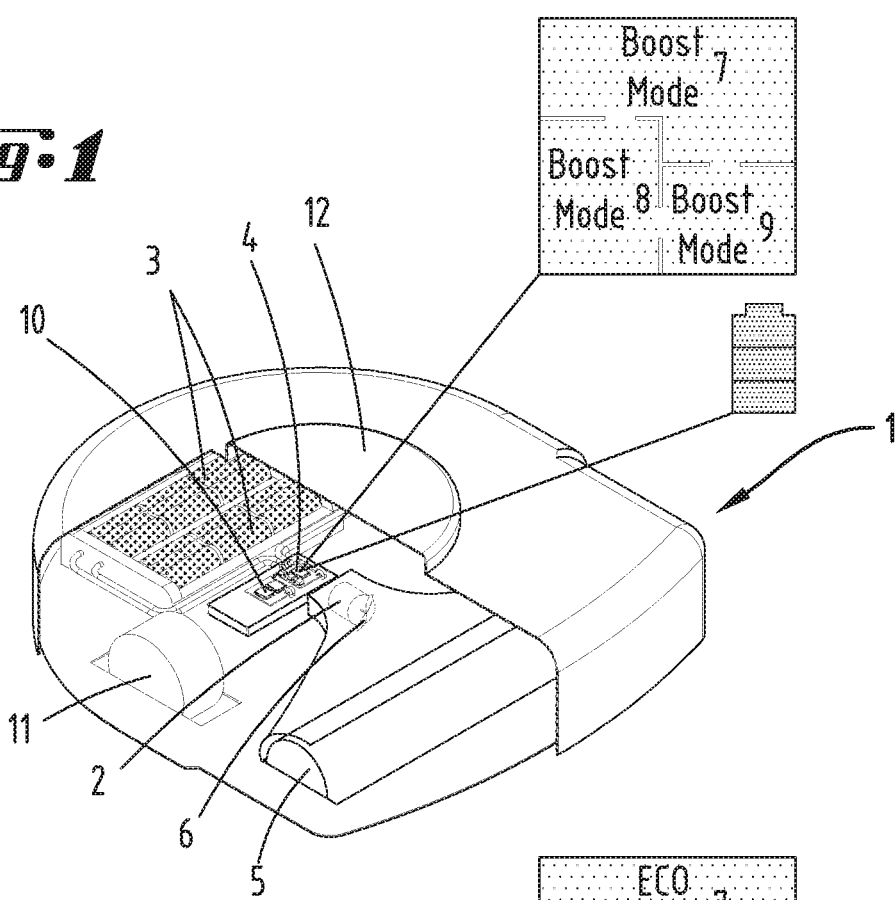
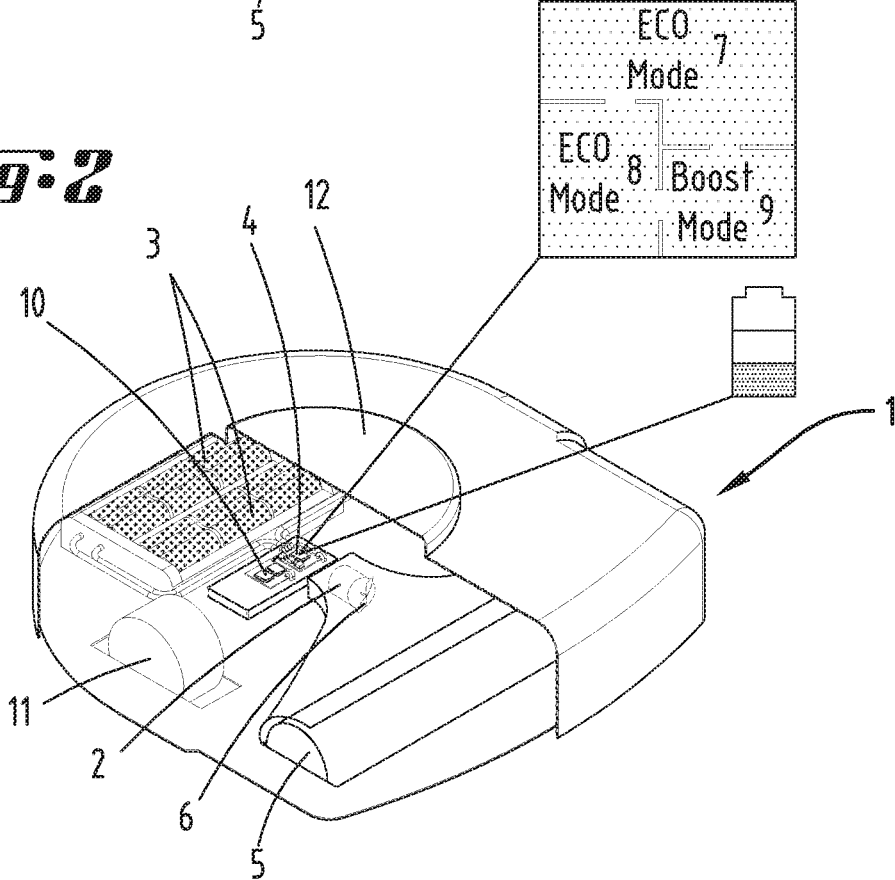

FLOOR PROCESSING DEVICE WITH A BATTERY

CROSS REFERENCE TO RELATED APPLICATIONS

Applicant claims priority under 35 U.S.C. § 119 of German Application No. 10 2017 118 227.6 filed Aug. 10, 2017, the disclosure of which is incorporated by reference.

BACKGROUND OF THE INVENTION

1. Field of the Invention

The invention relates to a floor processing device with at least one electrical consumer, a battery for supplying power to the electrical consumer, and a control device for controlling the floor processing device.

In addition, the invention relates to a method for operating a floor processing device with at least one electrical consumer, a battery for supplying power to the electrical consumer, and a control device for controlling the floor processing device.

2. Description of the Related Art

Floor processing devices of the aforementioned kind are known in prior art in a plurality of different embodiment variants. For example, these can be cleaning devices, polishing devices, lawnmowers or others. In particular, the floor processing device can be an automatically moving floor processing device in the form of a mobile robot.

The battery of the floor processing device is used to supply energy to electrical consumers. Depending on the amount of energy required in the operating mode, it can happen that an energy demand might be greater than an amount of energy stored in the battery, so that the battery must be recharged so that the operating mode can be continued or completely executed.

For example, publication JP 2006-020830 A discloses an automatically moving cleaning robot, in which a cleaning time required for a cleaning cycle is calculated, wherein a required battery capacity is calculated from the required cleaning time and compared with an available charging capacity, wherein a recharging of the battery for the required remaining cleaning time is initiated if the current charging capacity is insufficient.

The disadvantage here is that the operating activity must be ended so as to initially recharge the battery of the cleaning device to a point where any pending residual cleaning can be fully concluded. Recharging the battery takes time on the one hand, and frequent recharging negatively affects the service life of the battery on the other.

SUMMARY OF THE INVENTION

Proceeding from the aforementioned prior art, the object of the invention is to further develop a floor processing device in such a way that an operating activity can be continued even if it is determined that the amount of energy in the battery is insufficient, so that the battery must be recharged only after the operating activity has been completely executed.

In order to achieve this object, it is proposed that the control device be set up to determine the anticipated energy required by one or more consumers to perform and fully complete a predefined operating activity, compare the anticipated energy required with an amount of energy stored in the battery, and if the stored amount of energy is less than the energy required, reduce the energy required by adjusting one or several operating parameters for the operating activity, in order to successfully execute the operating activity.

According to the invention, then, a battery charge required for a specific, complete operational task of the floor processing device is calculated, and if a battery charge is found to be currently inadequate, an operating parameter for the operating activity is adjusted, to include device parameters for the floor processing device, so as to be able to fully and successfully complete the planned operating activity with the currently available battery charge. This eliminates the need for at least partially recharging the battery right away, which would delay the completion of the operating activity on the one hand, and also could negatively influence the service life of the battery on the other. The actual amount of energy available inside of the battery depends on the condition of the battery and its current charging capacity, and allows an inference to be made as to whether the planned operating activity can be carried out completely or with altered operating parameters. Should an available amount of energy for the battery not be sufficient for successfully performing the operating activity even with varied operating parameters, the operating activity can of course also be interrupted so as to initially charge the battery during a resting phase.

It is proposed that adjusting the operating parameter involve adjusting an operating parameter for an electrical consumer and/or a processing means used for a floor processing activity and/or adjusting an operating mode of the floor processing device. The operating activity can thus be varied in different ways so as to require a lower amount of energy for performing the floor processing activity. For example, an electrical consumer, e.g., a drive motor, can be switched into an Eco mode, which requires a lower amount of energy than the usually employed standard mode. In addition, an operating activity, for example a cleaning operation, of the floor processing device can also be varied by switching from a wet cleaning mode to a dry cleaning mode, for example so that no pump is required for conveying liquid onto a surface to be cleaned.

In particular, the varied operating parameter can be selected from the following group: Operation or nonoperation of an electrical consumer, speed of a drive motor for a drive of the floor processing device, speed of a drive motor for a floor processing element, speed of a drive motor for a fan, operation or nonoperation of a liquid application device. As a consequence, electrical consumers of the floor processing device can either be turned off completely or operated with deviating device parameters. For example, an electric motor can be varied in such a way that its speed is reduced, and a required amount of energy also drops accordingly. For example, electrical consumers of the floor processing device can be drive motors for wheels of the floor processing device, for driven floor processing elements, for a suction fan or also a pump of a liquid application device. In particular, it is possible that the drive motors can be operated in different modes, for example an Eco mode, a boost mode with elevated cleaning power, and others.

Each work mode can have allocated to it different operating parameters, for example which influence a suction power, brush power and/or traveling speed of the floor processing device. However, the influence is exerted only to an extent at which the floor processing activity can still be successfully concluded. In particular, it can be provided that several operating parameters be adjusted, so that not only an electrical consumer saves the required differential energy amount, but several electrical consumers combined.

It is proposed that the control device be set up to vary an operating parameter for a defined partial spatial area of an environment. The defined partial spatial area can be a home comprised of a room or several rooms, for example, which is processed with operating parameters deviating from those of one or several other partial spatial areas of the home. This embodiment is especially advantageous in an automatically moving floor processing device, which has a navigation and self-localization system for automatically moving within the environment. In this embodiment, partial spatial areas can be mapped by a laser distance system or image acquisition device, for example, or also via a user input on the floor processing device itself or via an external terminal device, for example a mobile device like a smartphone or tablet computer, which has a communications link with the floor processing device. The measuring data recorded within the environment can be used to generate an area map for the floor processing device, which is accessed by the navigation and self-localization system. The control device can preferably also access this area map, so as to select a spatially limited partial area in which one or several operating parameters can be varied so as to reduce an overall energy demand of the floor processing device. In particular, the control device can select the type of partial spatial area that usually has less contamination than other partial spatial areas. In addition, the partial spatial area can also be selected based on the type and/or number of obstacles located there and/or depending on the composition of a floor cover, which requires a larger expenditure of energy for the floor processing device to move, for example.

In particular, it is proposed that the control device be set up to adjust an operating parameter in a spatially alternating manner relative to several defined partial spatial areas given operating activities to be performed in chronological sequence, so that an operating parameter is adjusted during a first operating activity in a first partial area, and the operating parameter is adjusted during a second operating activity in a second partial area different from the first partial area. Alternatingly adjusting the operating parameters over time in several partial areas can yield a uniform floor processing performance, so that an operating parameter is not always adjusted only in the same partial area, but rather uniformly distributed in all partial areas viewed over a specific operating duration of the floor processing device. For example, the amount of energy can be economized by using an Eco mode in one of several partial areas at a first point in time, while the remaining partial areas are processed in a standard mode. During a floor processing activity performed at a later time, an Eco mode can then be set in another partial spatial area. This selection can be changed with every new operating activity, for example.

It is further proposed that the floor processing device have a detection device, which is set up to detect an environment parameter that influences the energy demand, and transmit it to the control device. For example, the environment parameter influencing the energy demand can be a characteristic of a surface to be processed. The detection device can especially preferably have a floor sensor, which can determine a floor type, floor structure, contamination type, contamination level or other parameters for the surface to be processed. If necessary, the parameters can be adjusted and/or supplemented by a user. The energy demand of the floor processing device can be determined based on the parameters recorded by the detection device. For example, a more intensive cleaning activity is required given high contamination levels than for nearly clean floor surfaces. After detecting the environment parameters, the control device preferably first checks whether the floor can be processed, in particular cleaned, with the selected operating parameters and amount of energy available. This check can take place in such a way as to have the floor processing device first perform a processing operation with the usual operating parameters, and in so doing determine an energy demand for individual partial spatial areas. An overall energy consumption is then calculated from this, and compared with the amount of energy available. If the control device determines that the required overall energy demand exceeds the existing amount of energy available, the control device can adjust the operating parameters for specific partial spatial areas, thus enabling an operating activity in all partial spatial areas of the environment with the amount of energy stored in the battery, without having to recharge it. For example, as explained above, this can be achieved by changing the traveling speed of the floor processing device, or also by an express cleaning of the partial spatial areas and the like.

It is further proposed that the control device have allocated to it a data memory, which contains reference data about an anticipated energy demand for performing a predefined operating activity. For example, the data memory can store data from chronologically preceding floor processing activities, so that the control device can determine an expected energy consumption, for example in defined partial spatial areas, and from that calculate an overall energy consumption for a plurality of partial areas in an environment. Typical energy consumptions for specific device parameters, operating parameters, floor types and/or surfaces to be processed can further be stored, from which the control device, with knowledge of the surface to be currently processed, can then determine an anticipated energy demand. The control device of the floor processing device can also receive control commands from a central control device that is arranged outside of the floor processing device and communicates with the control device of the floor processing device over a wireless connection. For example, a wireless communications link such as WLAN, Bluetooth or ZigBee is advantageous for this purpose. The central control device can be a local setup of an external device or a setup of a cloud server system. In like manner, the data memory allocated to the control device can be a data memory in the floor processing device itself or also an external data memory.

In addition to the floor processing device described above, the invention further proposes a method for operating a floor processing device, which has at least one electrical consumer, a battery for supplying energy to the electrical consumer, and a control device for controlling the floor processing device, wherein the control device determines an anticipated energy demand of one or several consumers for performing and fully completing a predefined operating activity, compares the energy demand with an amount of energy stored in the battery, and if the stored amount of energy is less than the energy demand, reduces the energy demand by adjusting one or several operating parameters of the operating activity, so as to successfully perform the operating activity.

The method serves in particular for operating a floor processing device described above, so that the features and advantages described in relation to the floor processing device simultaneously also apply to the method according to the invention.

In particular, it can be provided with respect to the method that an operating parameter for an electrical consumer and/or a processing means used for a floor processing activity and/or an operating mode for the floor processing device be varied.

In addition, it is proposed in particular that the control device vary an operating parameter for a defined partial spatial area of an environment.

It is especially preferably proposed that the control device adjust an operating parameter in a spatially alternating manner relative to several defined partial areas given operating activities to be performed in chronological sequence, so that an operating parameter is adjusted during a first operating activity in a first partial area, and the operating parameter is adjusted during a second operating activity in a second partial area different from the first partial area.

In addition, it is possible for the control device to monitor the actual energy demand of the floor processing device from the start of the cleaning activity, and through permanent synchronization with the calculation of the expected energy demand performed at the start of the cleaning activity determine whether the prognosis is pretty much accurate, or whether there are unexpected deviations requiring that the operating parameter be further adjusted.

In all energy demand calculations, the control device can routinely consider that a residual amount of energy must in all cases be retained in the battery, thus enabling a reliable return of the floor processing device to a charging or base station.

The energy consumed during the operating activity of the floor processing device can be stored in the data memory of the control device in the form of an energy envelope curve. This energy envelope curve comprises a sequence of energy consumption values stored over a time period and/or stretch, which are smoothed out in an additional calculation step. Based on comparative examinations of such energy envelope curves, which are stored for all partial spatial areas, the control device of the floor processing device can determine a partial spatial area before the operating activity starts that can be cleaned as optimally as possible with the amount of energy available, and in this way make an adjustment thereto by selecting suitable partial spatial areas.

Furthermore, an energy map can be generated by the floor processing device, which is an additional map to the area map generated by the cleaning device. The energy map displays the actual energy consumption of the floor processing device at any traversed position in the environment. The energy map can be displayed to the user on an external terminal device, such as a mobile phone, laptop or the like. The energy values can be displayed by a corresponding color value, making it possible to recognize the location in a room where energy consumption has been especially higher or lower, similarly to a thermographic representation. In this way, for example, the user can define partial spatial areas that can be excluded in a future cleaning run from an energy-saving standpoint. It is also conceivable that the user identify and if necessary eliminate any possible reasons for a high energy demand. For example, moving chairs away from a table or moving a vase in the environment can influence the traversing strategy of the floor processing device so positively as to enable a simplified and energy-saving operating activity with fewer maneuvers.

BRIEF DESCRIPTION OF THE DRAWINGS

The invention will be explained in more detail below based on exemplary embodiments. In the drawings:

FIG. 1 shows a floor processing device with a first setting of operating parameters, and FIG. 2 shows the floor processing device with a second setting of operating parameters.

DETAILED DESCRIPTION OF THE PREFERRED EMBODIMENTS

In a partially exploded, perspective view, FIG. 1 shows a floor processing device 1 designed as an automatically moving cleaning robot. The floor processing device 1 has motor-driven wheels 11 for moving the floor processing device 1 within an environment. In addition, the floor processing device 1 has a navigation device with a distance measuring device 12, which is here designed as an optical triangulation measuring device, for example. The distance measuring device 12 measures distances from obstacles present in the environment, such as furniture, walls and/or people. A control device 4 of the floor processing device 1 generates an area map of the environment from the distance measuring data, based upon which the floor processing device 1 can orient itself while moving. The control device 4 further has allocated to it a data memory 10, which can store a generated area map on the one hand, and cleaning profiles with operating parameters to be used during an operating activity of the floor processing device 1, i.e., cleaning a surface, on the other.

The floor processing device 1 has a floor processing element 5, which here is a cleaning roller driven by an electric motor (not shown), which sweeps over a surface to be processed. The electric motor is an electrical consumer 2 in terms of the depiction. In addition, the floor processing device 1 has a fan 6 also driven by an electric motor, which is a main component of a suction device by means of which the floor processing device 1 can vacuum up dust and dirt from a surface to be cleaned into a suction chamber. The electric motor of the fan 6 is also an electrical consumer of the floor processing device 1. In order to supply power to the consumers 2, the floor processing device 1 has batteries 3, for example which can be charged at a base station for the floor processing device 1.

In addition, the bottom side of the floor processing device 1, i.e., a housing side facing toward the surface to be processed, has a detection device (not shown), which is set up to detect environment parameters such as characteristics of the surface to be processed. For example, these include a floor type and level of contamination of the floor to be processed. For example, the detection device here has an image acquisition device, which records images of the floor surface.

The control device 4 compares the images recorded by the detection device with reference images, so as to be able to derive a floor type and level of surface contamination. The data memory 10 can contain tabular operating parameters that relate to specific floor types, contamination levels and specific partial spatial areas 7, 8, 9 of a surface to be cleaned, for example rooms in a home, and are usually suitable for processing such a surface with such contamination levels. In addition, these operating parameters have allocated to them an indication about the anticipated energy demand of the consumer 2 required for operating the floor processing device 1, i.e., the drive motor that drives the wheels 11, the drive motor that drives the fan 6 and the drive motor that drives the floor processing element 5.

For example, the invention according to FIGS. 1 and 2 has to do with initially determining cleaning profiles for specific operating activities of the floor processing device 1 that involve one or several operating parameters. For example, the cleaning profiles here comprise various cleaning modes, specifically a relatively energy-saving Eco mode and a boost mode with a contrastingly elevated energy demand of the consumers 2. The different cleaning modes are characterized by various operating parameters, for example a specific suction power of the fan 6, a specific cleaning power of the floor processing element 5 or a specific traveling speed of the floor processing device 1 by means of the driven wheels 11. In addition, a cleaning mode or cleaning profile can also establish a specific cleaning type, for example a dry cleaning of the surface to be cleaned by means of the fan 6 and floor processing element 5, or a wet cleaning, in which a cleaning liquid is applied to the floor processing element 5 and/or the surface to be cleaned.

In addition, partial spatial areas 7, 8, 9 of the premises to be cleaned are acquired by means of the distance measuring device 12 or alternatively transmitted to the floor processing device via an entry into the floor processing device 1 or an external terminal device having a communications link with the floor processing device 1. In addition, environment parameters that influence the energy demand of the consumers 2 can be detected by means of the detection device. The detection device can also detect the floor optically or alternatively also acoustically, for example. If necessary, the detection results can be adapted or supplemented by the user of the floor processing device 1.

After the environment parameters have been detected and cleaning profiles have been defined with specific cleaning modes, the control device 4 of the floor processing device 1 checks whether an operating activity selected by the user, i.e., for example a specific cleaning mode, can take place at the current charging state of the battery 3, i.e., whether the amount of energy stored in the battery 3 is sufficient for performing the operating activity using defined operating parameters. This check can be performed in such a way that the floor processing device 1 initially effects processing with the preset standard operating parameters, and in so doing determines an energy demand of the consumers 2 within the individual partial spatial areas 7, 8, 9. An overall energy consumption is calculated from the required amounts of energy for all consumers 2 of the floor processing device 1, and compared with the amount of energy stored in the battery 3. If the control device 4 determines that the overall energy consumption is higher than the amount of energy stored in the battery 3, the control device 4 adjusts the operating parameters, for example for two partial spatial areas 7, 8 of all partial spatial areas 7, 8, 9 to be cleaned. As a result, all partial spatial areas 7, 8, 9 can be cleaned with the currently stored amount of energy. For example, the altered operating parameter here involves a change (increase) in an average traversing speed of the floor processing device 1 during the cleaning operation, which as a whole results in a shorter overall time for a cleaning operation. As a consequence, the partial spatial areas 7, 8 undergo an express cleaning, which requires a lower amount of energy as a whole. In this sense, a preliminary cleaning operation can be provided, in which the traversing strategy of the floor processing device 1 is adjusted in such a way that possibly only the main surfaces of an area to be cleaned are cleaned, while hard to reach surfaces, for example under a dining table set with chairs, which require a plurality of maneuvers, are not cleaned. Cleaning room corners with a plurality of back and forth movements can also be done less thoroughly by instead traversing uniform curves, which yields a corner area that remains untraversed and uncleaned, but is tolerable to a user from the standpoint of a preliminary cleaning operation.

It is further conceivable that a cleaning profile alternate relative to the partial spatial areas 7, 8, 9, so that the cleaning quality remains homogenous within all partial spatial areas 7, 8, 9 (in relation to a longer operating period of the floor processing device 1). As an alternative to automatically adjusting the operating parameters, it is also possible that a user of the floor processing device 1 or an external device having a communications link therewith be informed about a necessity to adjust the operating parameters, wherein the user can then accept or reject the proposed operating parameters. During the operating activity, the energy demand might even be briefly elevated, should a dust quantity sensor detect a local, temporarily elevated level of dirt.

In addition, a detection device of the floor processing device 1 can determine what condition the battery 3 is in, i.e., the current charging capacity it has and its aging condition. The currently stored amount of energy available can be determined from the above. This information can be acquired continuously or in random or fixed time intervals.

It is possible for the floor processing device 1 to determine typical energy consumptions of the consumers 2 from earlier operating activities. Furthermore, typical energy consumptions can be stored for specific operating parameters, floor types, contamination levels and the like, from which the control device 4 can then determine an energy demand, for example as a function of a known floor type and as a function of selected operating parameters. The control device 4 can basically be a local control device 4 of the floor processing device 1 or also an external central unit that is arranged outside of the floor processing device 1, and has a communications link with the floor processing device 1 via a wireless or wired communications channel. The central unit can be part of a cloud server system, for example.

In a special embodiment, it is possible that three partial spatial areas 7, 8, 9 are to be cleaned according to a cleaning profile to be selected by a user. All partial spatial areas 7, 8, 9 are to be cleaned in a boost mode as depicted on FIG. 1, which requires a specific suction power of the fan 6 and a specific brush power of the floor processing element 5. After determining the overall energy demand for all consumers 2 participating in the operating activity, the control device 4 determines that the amount of energy stored in the battery 3 is insufficient for completely performing the desired cleaning profile in all partial areas 7, 8, 9. The control device 4 thereupon changes the cleaning—as shown on FIG. 2—in such a way that two of the partial spatial areas 7, 8, 9, specifically the partial spatial areas 7 and 8, are cleaned in an Eco mode, which has a lower energy demand. The additional partial spatial area 9 is processed in a boost mode, as before. In order to achieve roughly the same cleaning quality in all partial areas 7, 8, 9, the boost mode can also be used in the remaining partially spatial areas 7, 8 at alternating times, so that the partial spatial area 7, 8, 9 being processed in the boost mode changes from operating activity to operating activity. In an ensuing cleaning operation, either the partial spatial area 7 or partial spatial area 8 is then processed in the boost mode, while the other partial spatial areas 8, 9 or 7, 9 are then processed in the Eco mode.

REFERENCE LIST

1 Floor processing device
2 Consumer
3 Battery
4 Control device
5 Floor processing element
6 Fan 7 Partial spatial area
8 Partial spatial area
9 Partial spatial area
10 Data memory
11 Wheel
12 Distance measuring device

What is claimed is:

1. A floor processing device comprising:
   at least one electrical consumer,
   a battery configured for supplying power to the electrical consumer, and
   a control device for controlling the floor processing device, the control device being configured to determine anticipated energy required by one or more consumers to perform and fully complete a predefined operating activity, compare the anticipated energy required with an amount of energy stored in the battery, and when the stored amount of energy is less than the energy required, reduce the energy required by adjusting one or several operating parameters for the operating activity, in order to completely execute the operating activity.

2. The floor processing device according to claim 1, wherein the control device is configured for adjusting an operating parameter for an electrical consumer or a processing means used for a floor processing activity and/or adjusting an operating mode of the floor processing device.

3. The floor processing device according to claim 1, wherein the operating parameter is selected from the group consisting of: operation or nonoperation of an electrical consumer, speed of a drive motor for a drive of the floor processing device, speed of a drive motor for a floor processing element, speed of a drive motor for a fan, and operation or nonoperation of a liquid application device.

4. The floor processing device according to claim 1, wherein the control device is set up to vary an operating parameter for a defined partial spatial area of an environment.

5. The floor processing device according to claim 4, wherein the control device is set up to adjust an operating parameter in a spatially alternating manner relative to several defined partial spatial areas given operating activities to be performed in chronological sequence, so that an operating parameter is adjusted during a first operating activity in a first partial area, and the operating parameter is adjusted during a second operating activity in a second partial area different from the first partial area.

6. The floor processing device according to claim 1, further comprising a detection device, which is set up to detect an environment parameter that influences the energy demand, and transmit it to the control device.

7. The floor processing device according to claim 1, further comprising a data memory allocated to the control device, the data memory containing reference data for an anticipated energy demand for performing a predefined operating activity.

8. A method for operating a floor processing device with at least one electrical consumer, a battery for supplying power to the electrical consumer, and a control device for controlling the floor processing device, comprising the steps of:
   determining with the control device an anticipated energy demand for one or several consumers for performing and fully completing a predefined operating activity,
   comparing with the control device the energy demand with an amount of energy stored in the battery, and
   when the stored amount of energy is less than the energy demand, reducing with the control device the energy demand by adjusting one or several operating parameters of the operating activity, so as to completely perform the operating activity.

9. The method according to claim 8, further comprising varying an operating parameter for an electrical consumer or a processing means used for a floor processing activity and/or an operating mode for the floor processing device.

10. The method according to claim 8, wherein the control device adjusts an operating parameter for a defined partial spatial area in a spatially alternating manner relative to several defined partial areas given operating activities to be performed in chronological sequence, so that an operating parameter is adjusted during a first operating activity in a first partial area, and the operating parameter is adjusted during a second operating activity in a second partial area different from the first partial area.

* * * * *